United States Patent [19]

Moulin

[11] 4,419,807
[45] Dec. 13, 1983

[54] TOOL CHANGE DEVICE

[76] Inventor: Georges Moulin, 17bis rue de Terrenoire, 42100 Saint.Etienne, France

[21] Appl. No.: 239,536

[22] Filed: Mar. 2, 1981

[30] Foreign Application Priority Data

Mar. 4, 1980 [FR] France .................................. 80 05680
May 23, 1980 [FR] France .................................. 80 12000

[51] Int. Cl.³ .......................................... B23Q 3/157
[52] U.S. Cl. ........................................ 29/568; 408/35
[58] Field of Search ................. 29/568, 26 A; 408/35; 414/223, 749, 750

[56] References Cited

U.S. PATENT DOCUMENTS

| | | | |
|---|---|---|---|
| 3,524,248 | 8/1970 | Durr et al. | 29/568 |
| 3,601,886 | 8/1971 | Gohren | 29/568 |
| 3,662,442 | 5/1972 | Noa | 29/568 X |
| 3,775,837 | 12/1973 | Tomita et al. | 29/568 |
| 3,780,423 | 12/1973 | Lilienthal et al. | 29/568 |
| 3,845,546 | 11/1974 | Rutschke | 29/568 |
| 4,084,300 | 4/1978 | Narushima et al. | 29/568 X |

*Primary Examiner*—William R. Briggs
*Attorney, Agent, or Firm*—Eric P. Schellin

[57] ABSTRACT

A tool change device, for transferring selected tools between a rotary tool magazine and the rotary spindle of a machine tool. The magazine has a plurality of sector-shaped tool holders, in each of which one tool is stored. Tools are individually loaded or unloaded at a corresponding orientation of the magazine, at which a selected sector-shaped tool holder is in axial alignment with the machine spindle. When in such alignment, the sector-shaped tool holder is moved axially into cooperative relationship with the spindle and tool transfer is effected. Means are provided to lock each of the sector-shaped tool holders into an inactive axial storage position, except when selected.

6 Claims, 3 Drawing Figures

TOOL CHANGE DEVICE

The invention relates to an automatic tool change device which can be adapted to all machine-tools with vertical or horizontal spindle, and to the automatic gripping and positioning means for said tools in the spindles of the machine-tools.

According to the invention, the change device can be either integral with the machine-tool, or it can built up later on and adapted to the machine-tool.

According to a first characteristic, this arrangement includes a tool storing magazine mounted upon a support forming sheath with free controlled vertical adjustment, said magazine consisting of independent tool-holding sectors which are moving circularly relative to the support thereof, each sector being vertically displaced alternately, and rectilinear along the generatrix of the magazine in order to permit, after the selection of a tool, then the separation in the radial plane of the selected tool-holding sector relative to the other tool-holding sectors, the gripping, the disengagement, the positioning of the selected tool in the spindle of the machine-tool, and this directly or indirectly through an intermediate means being also capable of vertical and rotary displacement, the whole of the movements making it possible to engage or to disengage the selected tool in the spindle of the machine-tool.

These and other characteristics will appear more clearly from the following description.

Figure 1:
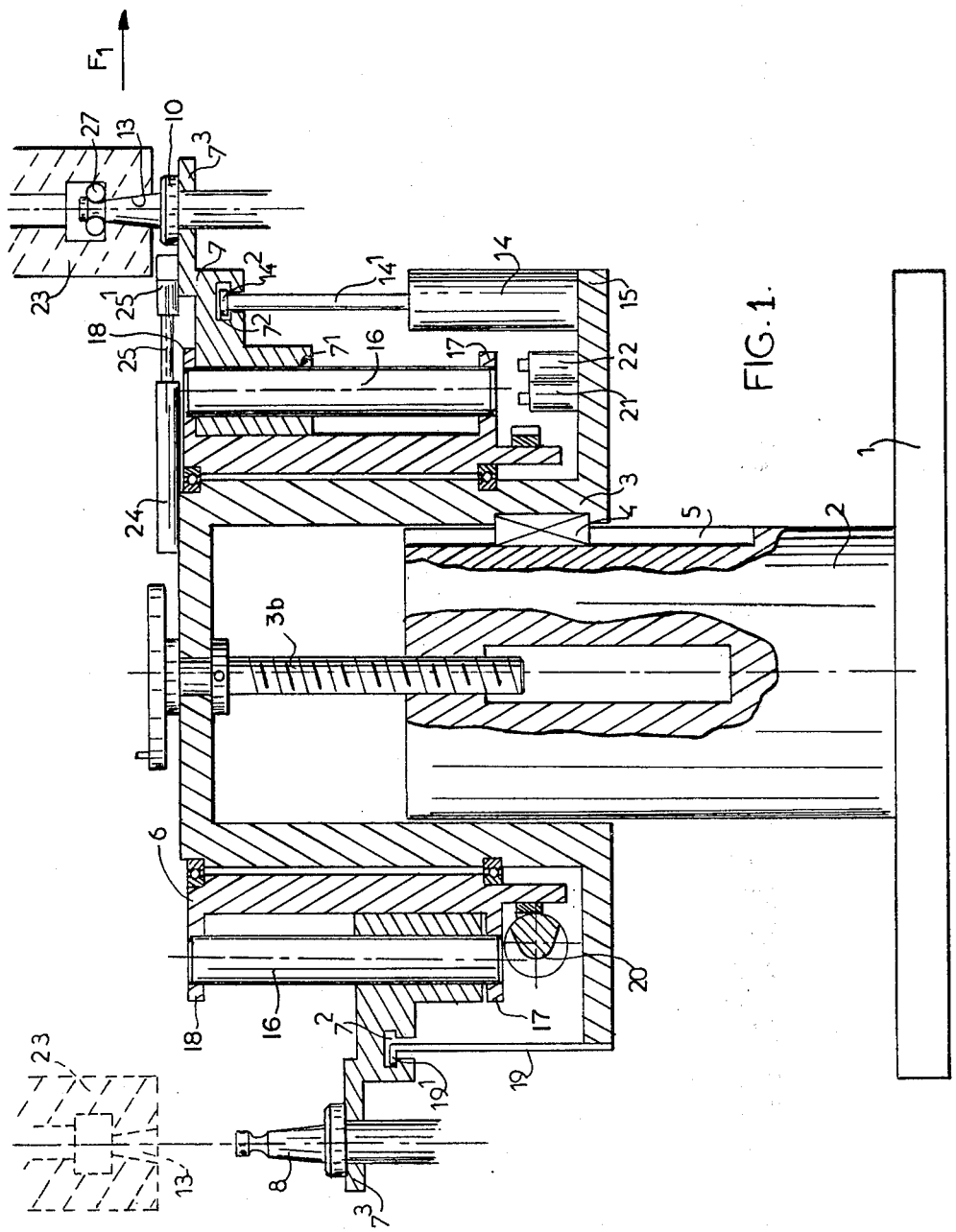
FIG. 1 is a side view, partly in section, illustrating the change device in accordance with the invention.

The tool change device consists of a base 1 which serves for securing the apparatus and for receiving all of the organs by which this apparatus is constituted, through the intermediary of a slideway 2 provided with a system allowing for the axial shifting of a sheath 3. This shifting serves for adjusting and positioning the cones 8 of the tool-holder relative to the spindle 23 of the machine tool. This sheath is guided radially by a key 4 which slides in a groove 5 or by any other equivalent system. The shifting of the sheath 3 may be provided by nut and screw 3b, or alternatively hydraulically, electrically, manually or automatically.

A rotary barrel 6 is supported by this sheath 3 and receives on the periphery thereof any number of sectors 7, all these sectors forming a crown which is the bottom of the tool magazine. The barrel 6 is rotated to a desired orientation by means of worm gear 20, which meshes with a circular rack mounted around the barrel 6.

Each tool-holding sector includes in the axial thickness thereof a bore $7^1$ for sliding engagement with a guide pin 16; each sector has externally an extension stepped in two portions, the first intermediate portion being formed with a groove according to an arched or a curved shape $7^2$, the second portion $7^3$ being arranged for receiving the clamping means of the tool holder.

Figures 2, 3:
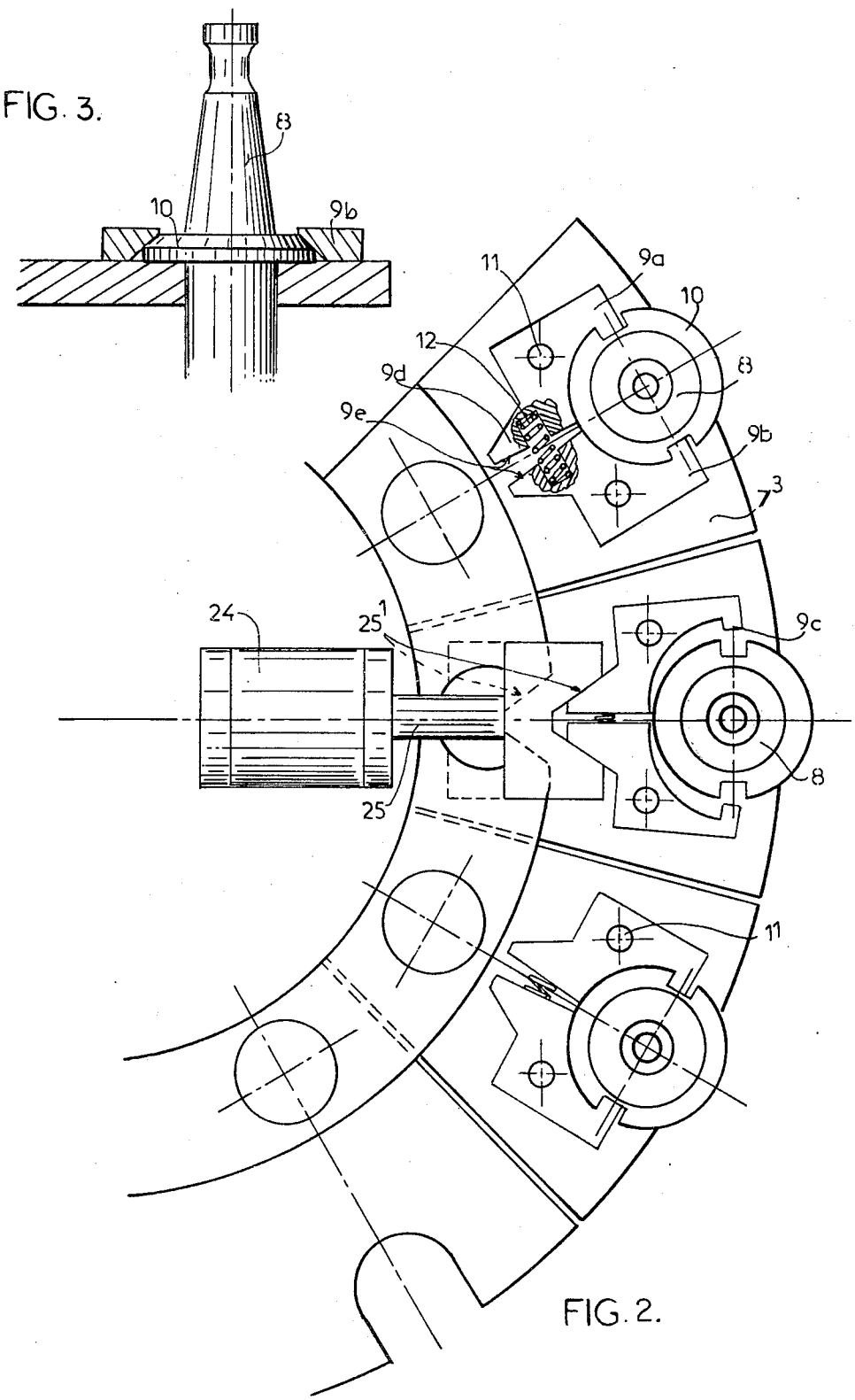
FIG. 2 is a top view of the magazine of the tool change device.
FIG. 3 is a view on an enlarged scale, illustrating the positioning of the tool-holder on one of the sectors forming the magazine.

Each sector receives a tool held in position and in orientation by a gripping system illustrated in FIG. 2, which may consist of two half-clips 9A–9B the internal ends of which form hooks 9C to maintain and position the tool by its collar 10. The shape of the clip is designed to maintain the tool radialy, FIG. 3. The half-clips are maintained laterally by the pins 11 which serve as pivots for these half-clips. The hooks 9C are maintained closed by a spring 12 when the clip is not in use.

The rear portion 9D of the two half-clips has a tapered projecting shape. The clips are caused to open by a double acting pressure cylinder 24 secured permanently to the sheath 3, by reason of the expansion of the piston rod 25 the tip $25^1$ of which is shaped complementary to the rear shape 9D of the clips and is operating in the same way as a cam. The tip $25^1$ engages and bears against the rear portions of the clips, in order to open them gradually while compressing the spring 12 disposed between the opposite walls 9E.

The sectors 7 have a rotary motion which is imparted by the drive of the barrel 6. This motion can be actuated by a ratchet system, a cam system, a Maltese cross system, by hydraulical, electrical or other motor, provided that it will be possible for each sector to be positioned accurately. The purpose of the rotation and of the positioning of the barrel is to place within the same angular axis the shank of the tool and the taper of the spindle which is to receive this tool.

In accordance with a further characteristic, the sectors 7 receive also a rectilinear reciprocating motion which after the angular positioning of the tool 8 makes it possible to engage this tool within the taper of the spindle 23. The movement is imparted by a double acting cylinder 14 secured to a support 15 integral with the sheath 3, the piston rod $14^1$ controlling the sector 7 by means of a connection which may be a circular groove $7^2$ in the form of a female T in which is engaged the tip $14^2$ of the piston rod in the form of a male T. The sectors 7 are guided in their rectilinear motion by pins 16 which are mounted between two webs 17–18 integral with the barrel 6.

In accordance with a further characteristic, the shifting of the sectors is prevented by a safety device when the sectors are not controlled by the cylinder 14. This safety consists of an annular sector 19 which has a collar $19^1$ engaged within the T-shaped groove $7^2$, the collar being then placed within the bar of the T; it will be apparent that no rectilinear shifting of the sectors is possible, whereas the entire tool magazine can be rotated freely. At the angular position of the control cylinder 14, a portion of the annular sector 19 has been broken away, in order to permit the vertical shifting of the sector 7. The correct orientation of the barrel as well as the correct positioning of the sectors are provided by the micro-contacts 21–22.

The operation of the change device will be now described. In the starting position, the taper 13 of the spindle 23 without tool is positioned in alignment with the axis of the tool shanked to be loaded. The locking system 27 in the cone of the spindle is in the open position. Upon a command being given, the selected sector is shifted vertically by the cylinder 14 for the insertion of the shank 8 of the tool within the taper 13 of the spindle 23. The tool is gripped and secured by the locking system within the cone of the spindle. The cam $25^1$ is shifted by the cylinder 24 and opens the clips 9A–9B, making the tool free. The loaded spindle can be disengaged along the arrow F1.

Cylinders 14 and 24 are under pressure during all the working time of the spindle. The operation of the machine is stopped immediately by a safety device if either one of these cylinders is not in normal pressure.

For changing the tools, the spindle comes back to the initial position, engaging the tool in the housing thereof on the sector 7³. The piston rod 25 is retracted, disengaging the cam 25¹, then the two half-clips are closed again and maintain the tool under the influence of spring 12.

The clamping system located within the spindle of the machine is opened and discharges the tool. The cylinder 14 is retracted, driving the sector 7 and the tool in the lower position, and disengaging completely the shank of the tool. The barrel 6 is then driven for a fraction of a turn by the device 20, placing the tool in a change position for a further sequence.

The automatic tool change device which has just been described can be mounted or integrated on any type of machine, an can co-operate with several tool gripping devices.

I claim:

1. Tool-changing device adaptable to tool machines, comprising a storage magazine for tools mounted on independent supports and capable of rotating so as to present the selected tool to a gripping means which can disengage the selected tool from its storage position and engage it into the spindle of the machine, characterized in that it comprises:

a base (2);
   a cylindrical sleeve (3), having a longitudinal axis of symmetry, supported on said base for non-rotating rectilinear motion in a direction parallel to said axis;
   a rotary barrel (6) mounted on and about said sleeve for concentric rotation about said axis;
   cheeks (17 and 18) extending outwardly from the opposite ends of said rotary barrel;
   a series of guide pins (16) positioned circumferentially about said axis, with their axes parallel to said axis, and extending between said cheeks;
   a corresponding series of annular sectors (7) mounted individually for motion along said pins parallel to said axis and parallel to said rectilinear motion;
   each annular sector having means (9) to hold a tool;
   each of said annular sectors having a circular tee-shaped groove (7²) therein, concentric about said axis;
   a cylindrical safety ring (19), concentric about said axis and fixed to said cylindrical sleeve by a support (15), said safety ring having a circular flange (19¹), said safety ring and flange being of such dimension as to be meshable with the tee-shaped groove of an annular sector to thereby hold said annular sector captive against movement parallel to said axis but permit rotational motion about said axis;
   said safety ring having a gap in its periphery of extent sufficient to release a one of said annular sectors from captive relationship between the tee-shaped slot in said one of said annular sectors and said safety ring and flange, when said barrel is rotated to bring said one of said annular sectors into alignment with said gap;
   a jack (14) mounted on said support (15) and having an actuator (14²), said jack being located to have its actuator mesh with the tee-shaped slot of a one of said annular sectors while said one of said annular sectors is rotatably positioned at said gap in the safety ring and therefore not captive against movement parallel to said axis;
   whereby said jack may move said one of said annular sectors parallel to said axis into a position out of longitudinal alignment with the other sectors;
   whereby the tool held by said one of said annular sectors is positioned in space at a unique location, remote from positions in which tools are stored in other annular sectors.

2. Tool-changing device according to claim 1, characterized in that each annular sector comprises:
   an inner annular zone having a longitudinal bore which slides on the said guide pin (16);
   an intermediate annular zone which contains said circular tee-shaped groove (7²);
   the intermediate annular zones of said annular sectors defining a substantially continuous tee-shaped groove; and
   an outer annular zone having tool grasping means thereon for holding an individual tool to said annular sector.

3. Tool-changing device according to claim 2 in which the said tool grasping means comprises
   two semi-pincers (9A-9B) whose inner ends form hooks (9c) for retaining and positioning the tool by grasping its collar (10).

4. Tool-changing device according to claim 3 characterized in that the semi-pincers constituting each tool grasping means are freely pivoted on axles (11) fixed to each annular sector (7) to function as their point of rotation;
   the back part (9D) of the two semi-pincers being profiled in a conically projecting profile; and
   a spring maintained under compression located between the walls facing the back parts of the semi-pincers to assure the tightening of the tool-holder.

5. Tool-changing device according to claim 4 characterized in that a single means (24) of the jack type, fixed to the sleeve (3), ensures, as a result of the extension of its piston rod (25), the tip (25¹) of which is profiled in the shape of a cam complementary to the back profile (9D) of the pincers and as a result of the engagement of the tip (25¹) onto this back profile, the progressive opening of the pincers while compressing the return spring (12) and freeing the tool.

6. Tool-changing device according to claim 1 characterized in that microcontacts (21-22) are located along the support (15) which is rigidly locked with the sleeve (3) and are used to control the correct position of the sectors before one is elevated by means of the jack (14).

* * * * *